Sept. 14, 1926.

V. A. FYNN 1,599,753

DYNAMO ELECTRIC MACHINE

Filed Nov. 9, 1923

Inventor,
VALÈRE ALFRED FYNN,
by John K. Bruninga
His Attorney.

Patented Sept. 14, 1926.

1,599,753

UNITED STATES PATENT OFFICE.

VALÈRE ALFRED FYNN, OF ST. LOUIS, MISSOURI.

DYNAMO-ELECTRIC MACHINE.

Application filed November 9, 1923. Serial No. 673,685.

My invention relates more particularly to polyphase motors and generators.

Figure 1:
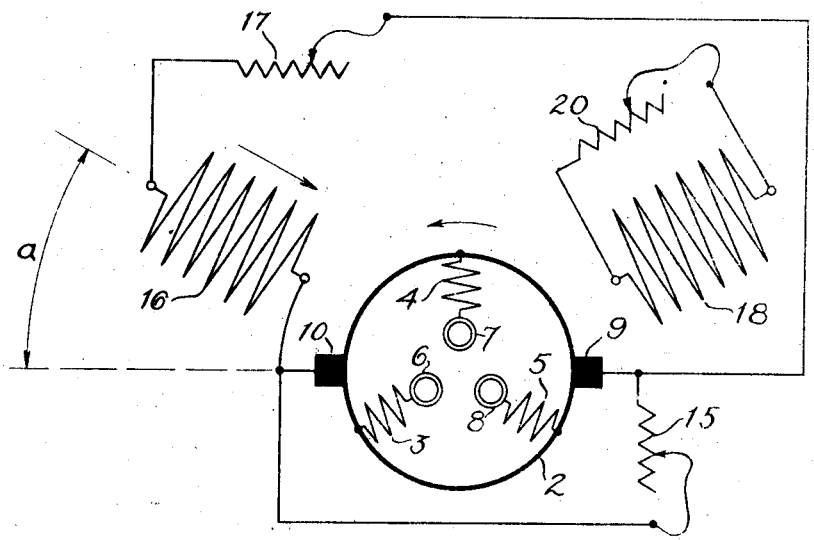
Figure 2:
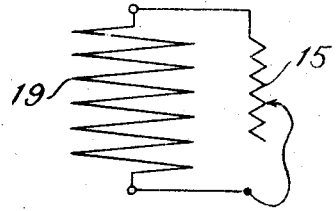
Figure 2:
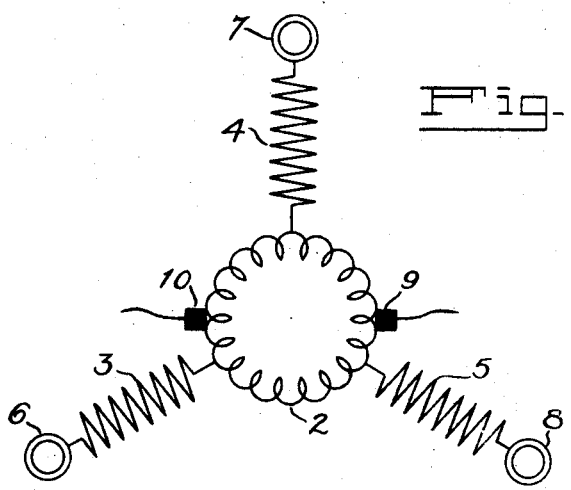

The accompanying diagrammatic drawings show in Figure 1 one embodiment of my invention, while Figure 2 shows the preferred form of primary winding.

Referring to Figure 1 which illustrates a two-pole three-phase motor, both stationary and revolving members are preferably of the stator and rotor type and, therefore, have no defined polar projections. The figure shows a motor with a revolving primary. The rotor carries a commuted winding 2 indicated by a heavy circle, connected to a commutator which is not shown and with which co-operate brushes 9 and 10, shown in the figure as resting directly on the winding 2. The rotor also carries a three-phase star connected winding 3, 4, 5, suitably interconnected with the commuted winding 2 and provided with slip-rings, 6, 7, 8 for connection to the supply. Figure 2 illustrates this arrangement of rotor windings more clearly.

The stator of the motor carries a three-phase arrangement of windings 16, 18 and 19, of which the first is displaced by less than 90 electrical degrees from the brush axis and connected to the brushes with the interposition of the adjustable resistance 17, while the two others are displaced by 120 electrical degrees from each other and from the first and are closed over the adjustable resistances 20 and 21. The axis of 16 is displaced from the brush axis by the angle $a$ in a direction opposed to that in which the rotor revolves. In addition to this an adjustable resistance 15 is connected to the brushes 9, 10 and is adapted to shunt the commuted winding 2.

The operation of the motor shown in Figure 1 is somewhat as follows: Assuming the resistance 15 to be disconnected, the resistances 17, 20 and 21 are suitably adjusted and the slip-rings are connected to the supply, the motor starts like an ordinary polyphase induction motor. The resistances in the stator circuits can be reduced in one or more steps to their normal value. The normal value for 20 and 21 is zero, that for 17 is the one which gives the desired power factor characteristic, this characteristic, is, however, also influenced by the magnitude of the angle $a$. Since the winding 16 is the only one which has an external impedance in circuit with it, a somewhat more balanced starting condition can be secured and the load on the brushes reduced by shunting the commuted winding, which forms the external impedance referred to, by means of the non-inductive resistance 15. At starting the voltage induced in the winding 16 is much greater than the one induced in the commuted winding and 15 may readily be given a value which will permit a considerable current to flow through it and 16 while the current through it and the commuted winding will be very much smaller. The commuted winding then carries two currents, one through it and the winding 16 and another through it and the resistance 15 and while these are not exactly opposed in phase, yet they neutralize each other in part. In this way the starting may be improved and the load on the commutator reduced. As the sped increases the resistance 15 can be increased to infinity in one or more steps.

When the machine closely approaches synchronism the induction motor torque drops to a very small value, but the winding 16 now develops a very powerful synchronizing torque in conjunction with the revolving flux produced by the primary. Near synchronism this flux induces a very low voltage at slip frequency in 16 and a voltage of practically normal amplitude but slip frequency in the commuted winding. This brush voltage is preponderant near synchronism and because the frequency is very low the current it produces is practically in phase with it. When the primary flux is at right angles to the brush axis, the brush voltage is at maximum as is also the current in 16 and, therefore, the smaller the angle $a$ the greater the synchronizing torque. But 16 is not only to develop a synchronizing torque; it must also provide the unidirectional excitation and at least partly neutralize the armature reaction. For these reasons, the winding 16 is not made to coincide with the brush axis or be displaced from it by 90 electrical degrees, but to occupy a position intermediate between these two and one in which it will be able to fulfill all three duties sufficiently well. A displacement of 45 degrees or less gives good results with motors of average design.

After synchronism has been reached, the windings 18 and 19 become inactive, and the winding 16 contributes more or less to the unidirectional excitation or to the neutralization of the armature reaction as the load varies and in this way controls the power factor of the machine. The ampere turns of the winding 16 do not, however, vary proportionally with the load.

When a load is applied which is in excess of that which the machine can carry as a synchronous motor, it falls out of step but continues to operate as an asychronous motor, the windings 18 and 19 again coming into action, until its final load limit is reached.

When the primary is stationary the revolving flux revolves synchronously with respect to it and the secondary revolves in the same direction as this revolving flux. In a synchronous operation the speed of the secondary is a little short of that of the revolving flux, at synchronism the speed of the secondary is the same as that of the revolving flux. In applying this invention to a stationary primary, the brushes co-operating with the commuted winding on the primary must revolve with the secondary, but the operation of the machine will be as here explained for the converse arrangement.

Since all motors are capable of operating as generators, it will be clear that this machine will also be able to supply current and when so doing, the winding 16 of Figure 1 will serve to control the terminal voltage.

It is obvious that various changes may be made in details without departing from the spirit of this invention; it is, therefore, to be understood that this invention is not to be limited to the specific details shown and described.

Having thus described the invention, what is claimed is:

In a dynamo electric machine, a primary and a secondary without defined polar projections, a commuted and another winding on the primary, said other winding being adapted for connection to a polyphase supply, brushes carried by the secondary and co-operating with the commuted winding, and three windings on the secondary displaced by 120 electrical degrees, each of said windings forming part of an operatively closed circuit and one of said windings being connected to said brushes and deviating from that axis which is displaced by 90 electrical degrees from the brush axis.

In testimony whereof I affix my signature this 5th day of November, 1923.

VALÈRE ALFRED FYNN.

Certificate of Correction.

It is hereby certified that in Letters Patent No. 1,599,753, granted September 14, 1926, upon the application of Valère Alfred Fynn, of St. Louis, Missouri, for an improvement in "Dynamo-Electric Machines," an error appears in the printed specification requiring correction as follows: Page 2, line 15, for "a synchronous" read *asynchronous;* and that the said Letters Patent should be read with this correction therein that the same may conform to the record of the case in the Patent Office.

Signed and sealed this 26th day of October, A. D. 1926.

[SEAL.]

WM. A. KINNAN,
*Acting Commissioner of Patents.*